United States Patent
Erimli et al.

(10) Patent No.: US 6,745,246 B1
(45) Date of Patent: Jun. 1, 2004

(54) APPARATUS AND METHOD IN A NETWORK SWITCH FOR MODIFYING A BANDWIDTH REQUEST BETWEEN A REQUESTOR AND A ROUTER

(75) Inventors: Bahadir Erimli, Campbell, CA (US); Shr-jie Tzeng, Fremont, CA (US); Yatin Ramesh Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/493,108

(22) Filed: Jan. 28, 2000

(51) Int. Cl.$^7$ ............................................. G06F 15/173
(52) U.S. Cl. .................................. 709/238; 370/395.21
(58) Field of Search .................... 709/238; 370/395.21, 370/395.41, 398

(56) References Cited

U.S. PATENT DOCUMENTS

| | | | | |
|---|---|---|---|---|
| 5,461,611 A | * | 10/1995 | Drake et al. ................ | 370/420 |
| 5,604,731 A | * | 2/1997 | Grossglauser et al. ...... | 370/232 |
| 5,745,694 A | * | 4/1998 | Egawa et al. ............... | 709/225 |
| 5,872,769 A | * | 2/1999 | Caldara et al. ............. | 370/230 |
| 5,953,335 A | * | 9/1999 | Erimli et al. ............... | 370/390 |
| 6,028,840 A | * | 2/2000 | Worster ...................... | 370/230 |
| 6,104,700 A | * | 8/2000 | Haddock et al. ............ | 370/235 |
| 6,122,289 A | * | 9/2000 | Brown et al. ............... | 370/465 |
| 6,131,113 A | * | 10/2000 | Ellsworth et al. ........... | 709/213 |
| 6,167,054 A | * | 12/2000 | Simmons et al. ........... | 370/422 |
| 6,226,263 B1 | * | 5/2001 | Iwase et al. ................ | 370/231 |
| 6,240,066 B1 | * | 5/2001 | Nagarajan et al. .......... | 370/230 |
| 6,256,315 B1 | * | 7/2001 | Barbas et al. ............... | 370/412 |
| 6,345,038 B1 | * | 2/2002 | Selinger ...................... | 370/230 |
| 6,366,761 B1 | * | 4/2002 | Montpetit ................... | 455/12.1 |
| 6,407,985 B1 | * | 6/2002 | Jain ............................ | 370/256 |
| 6,421,348 B1 | * | 7/2002 | Gaudet et al. .............. | 370/401 |
| 6,438,630 B1 | * | 8/2002 | DeMoney .................... | 710/56 |
| 6,463,470 B1 | * | 10/2002 | Mohaban et al. ........... | 709/223 |
| 2001/0026551 A1 | * | 10/2001 | Horlin ......................... | 370/389 |
| 2001/0055305 A1 | * | 12/2001 | Oz et al. ..................... | 370/389 |
| 2002/0146036 A1 | * | 10/2002 | Berger ........................ | 370/468 |

FOREIGN PATENT DOCUMENTS

EP 535860 A2 * 4/1993 ........... H04L/12/56

OTHER PUBLICATIONS

Rybczynski, "Layer N Switching: Moving Up the Stack", Nortel Networks, "www.nortelnetworks.com", 5/99, 4 pages.*
Curtis, "Nortel Networks Continues Ownership of Layer 3 Switching Market", News Release Nov. 1998, 2 pages.*
Braden, Ed. et al., "Resource ReSerVation Protocol (RSVP)—Version 1 Functional Specification", Network Working Group, Univ. of Michigan (Sep. 1997).

* cited by examiner

Primary Examiner—Bunjob Jaroenchonwanit
(74) Attorney, Agent, or Firm—Manelli Denison & Selter PLLC; Leon R. Turkevich

(57) ABSTRACT

A network switch, configured for performing layer 2 and layer 3 switching in an Ethernet (IEEE 802.3) network without blocking of incoming data packets, includes a network switch port having a filter (i.e., a packet classifier module) configured for evaluating an incoming data packet on an instantaneous basis. The filter performs simultaneous comparisons between the incoming data stream of the data packet and multiple templates configured for identifying respective data protocols. The network switch uses the filter to detect the presence of an RFC 2205 compliant bandwidth reservation message from a host computer for reception by a router. The network switch is configured for selectively changing a requested quality of service specified in the bandwidth reservation message, based on a determined absence of available resources within the network switch. The network switch selectively increases the requested quality service, based on the determined absence of the available resources, to a value that will be denied by the router. Hence, the network switch can ensure that a router does not grant a bandwidth reservation message from a host computer that would cause the capacity of the network switch to be exceeded, without any modification to the host computer or the router, or any interference with the resource reservation protocol specified in RFC 2205.

18 Claims, 3 Drawing Sheets

APPARATUS AND METHOD IN A NETWORK SWITCH FOR MODIFYING A BANDWIDTH REQUEST BETWEEN A REQUESTOR AND A ROUTER

BACKGROUND OF THE INVENTION

FIELD OF THE INVENTION

The present invention relates to layer 2 and layer 3 switching of data packets in a network switch configured for switching data packets between and within subnetworks.

BACKGROUND ART

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a network switch.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

One example of the increased demand encountered by switched local area networks includes data transport of media streams for multimedia applications having quality of service requirements between a media source and a host computer configured as a receiver for a user. In particular, the Internet Engineering Task Force (IETF) Resource Reservation Setup Protocol Working Group has proposed a new standard (RFC 2205), entitled the Resource Reservation Protocol (RSVP), for setting up resource reservations in the Internet. The RSVP protocol can be used by a host receiver to request from a router, located along a path between a media source (i.e., a sender) and the host receiver, a specific quality of service (i.e., a guaranteed bandwidth) for a particular application in order to guarantee a quality of service from the sender to the receiver. The RSVP protocol can also be used by the routers to deliver the quality of service request to all nodes along the path and to establish and maintain state to provide the requested service.

For example, assume that a user at an end station wishes to enjoy reception of a high-quality video stream from a media source via the Internet. Assuming that the end station is a member of an Internet Group Management Protocol (IGMP) multicast group, the end station needs to send a bandwidth reservation (Resv) message to its local router according to the RSVP protocol to request bandwidth for an assured quality of service. The local router, in response to receiving the bandwidth reservation message, checks to see whether the end station is authorized to request the specified bandwidth. If the local router determines that the end station is not authorized to request the specified bandwidth, the local router returns a message denying the request to the end station; however if the local router determines that the end station is authorized to request the specified bandwidth, the local router forwards the request to the next router in the hop sequence toward the media source, enabling each router in the path between the media source and the end station to reserve bandwidth for the quality of service requested by the end station.

The above-described arrangement for requesting quality of service according to the RSVP protocol suffers from the disadvantage that the local router may approve the bandwidth request from the end station, even though a layer 2/layer 3 switch configured for switching data packets between the end station and the router does not have sufficient capacity to support the requested quality of service. Specifically, during the bandwidth reservation according to RSVP protocol there is no protocol exchange between the end station and the layer 2/layer 3 switch, nor between the layer 2/layer 3 switch and the local router. Hence, there is no means for the layer 2/layer 3 switch to send a message to either the end station or the local router if the layer 2/layer 3 switch is unable to support the bandwidth request.

SUMMARY OF THE INVENTION

There is a need for an arrangement that enables a network switch to provide layer 2 switching and layer 3 switching capabilities while supporting prescribed quality of service requirements.

There is also a need for an arrangement that enables a network switch to be easily programmable to identify data packets carrying bandwidth reservation messages so that quality of service (QoS) can be achieved.

There is also a need for an arrangement to enable a network switch to evaluate an incoming data packet having a bandwidth reservation message and determine whether the network switch is able to support the requested bandwidth.

These and other needs are attained by the present invention, where a network switch is configured for selectively changing a requested quality of service in a bandwidth reservation message, output from a host computer for reception by a router, based on a determined absence of available resources within the network switch. The network switch selectively increases the requested quality service, based on the determined absence of the available resources, to a value that will be denied by the router. Hence, the network switch can ensure that a router does not grant a bandwidth reservation message from a host computer that would cause the capacity of the network switch to be exceeded.

One aspect of the present invention provides a method in a network switching system. The method includes receiving by a network switching system a data packet from a host computer and having a media access control (MAC) destination address specifying a router. The method also includes detecting within the data packet a bandwidth reservation message having a requested quality of service, determining whether the network switching system has at least an available resource sufficient for the requested quality of service, and selectively increasing by the network switching system the requested quality of service in the data packet based on a determined absence of the available resource. The data packet is then output to the router based on the MAC destination address. The selective increase of the requested quality of service by the network switching system insures that the network switching system can control the bandwidth reservation process between the host computer and the router, without the necessity of establishing any messaging protocol between the host computer and the network switching system, or between the network switching system and the router. Hence, the network switching system can transparently control the bandwidth reservation process as needed without any modification to the bandwidth reservation protocol, the host computer, or the router.

Another aspect of the present invention provides a network switching system including an integrated network switch and a processing unit. The integrated network switch includes a plurality of network switch ports, at least one of the network switch ports configured for detecting within a data packet a bandwidth reservation message having a requested quality of service, the data packet received from a host computer. The integrated network switch also includes switching logic configured for identifying a second of the network switch ports for outputting the data packet to a router based on a corresponding media access control (MAC) destination address, and logic for selectively increasing the requested quality of service in the data packet. The processing unit is configured for controlling the logic to increase the requested quality of service in the data packet based on a determined absence of available resources within the integrated network switch sufficient for the requested quality of service. The determination by the CPU of whether the integrated network switch has a resource available that is sufficient for the requested quality of service insures that the integrated network switch is not overwhelmed due to the granting of the bandwidth reservation message by the router.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

The disclosed embodiment is directed to an arrangement in a network switch for selectively modifying a bandwidth request between a requestor and a router without interfering with the prescribed resource reservation protocol. A description will first be provided of the use of the resource reservation protocol (RSVP) for setting up resource reservations for a guaranteed quality of service, followed by a description of the arrangement for selectively modifying the bandwidth request according to the disclosed embodiment.

Figure 1:
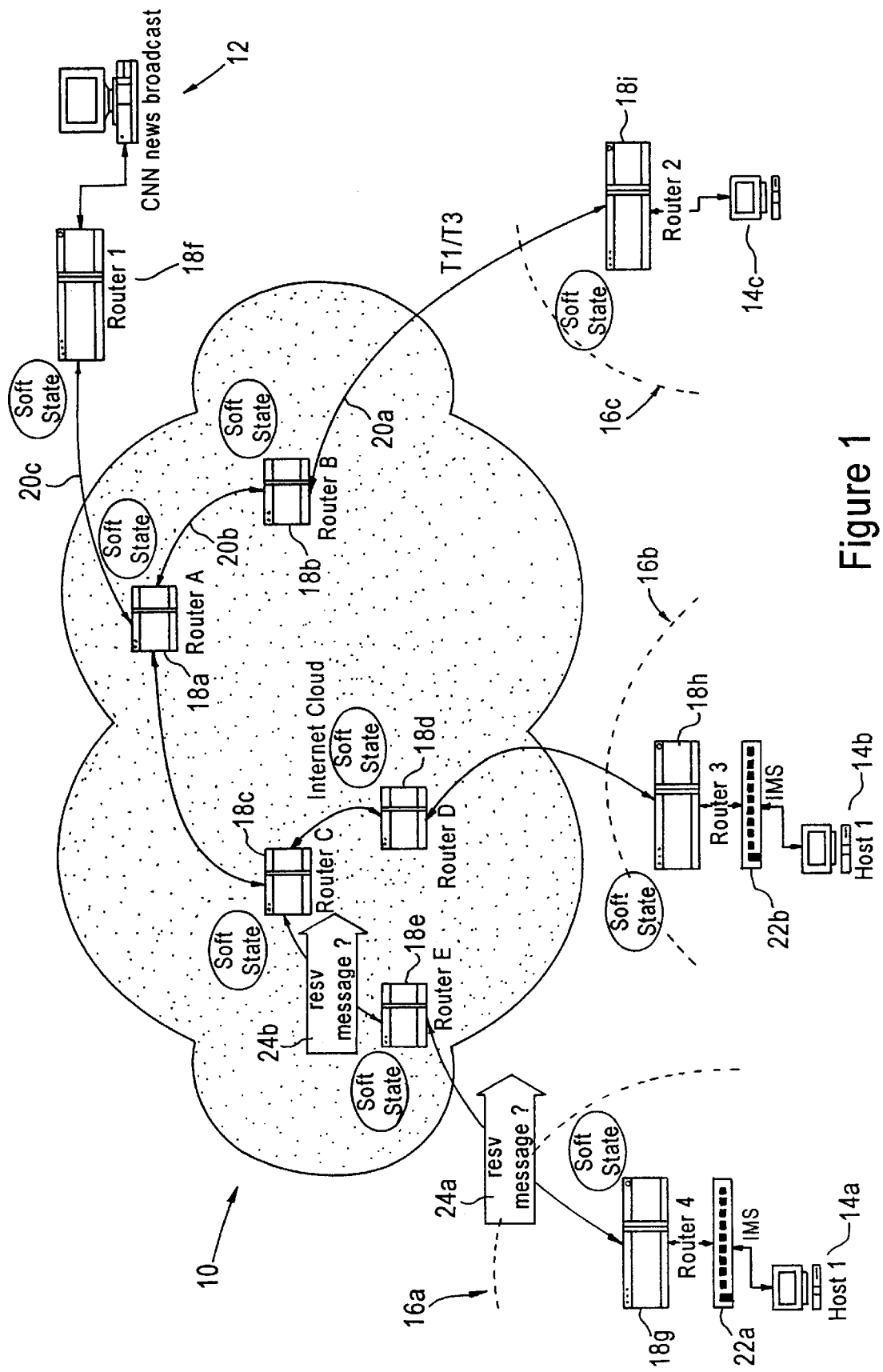
FIG. 1 is a block diagram of a packet switched network including a network switching system for selectively modifying a reservation message according to an embodiment of the present invention.

FIG. 1 is a block diagram illustrating a packet switched network 10 such as the Internet, configured for providing media streams from a media source 12 to host computers 14 at respective subnetworks 16 via routers 18 distributed throughout the network 10. As shown in FIG. 1, the media source 12, for example a server providing a media stream of a news broadcast, sends a media stream to an associated router 18f for transport of the media stream onto the packet switched network 10. As recognized in the art, each of the host computers 14 receives the media stream from the media source 12 by joining a multicast group associated with the media source 12. In particular, each host computer 14 first sends an Internet Group Management Protocol (IGMP) Frame to the media source 12 to join the multicast group. Once the IGMP Frame is received by the multicast source 12, then every router 18 along the path 20 between the multicast source 12 and the corresponding host 14 knows to add the corresponding host 14 to the multicast group. For example, the host 14c sends an IGMP frame that establishes a path to the media source 12 via routers 18i, 18b, 18a, and 18f; hence, the routers 18a and 18b become aware that the media stream from the media source 12a via the router 18f should be supplied to the router 18i. Similarly, the host computers 14a and 14b send their own respective IGMP frames to the media source 12, enabling the routers 18a, 18c, 18d, and 18e to learn that the media streams should also be supplied to routers 18g and 18h.

Transfer of the IGMP frame, however, does not provide a guaranteed quality of service. Hence, each host 14a, 14b and 14c may still encounter reduced performance in the media stream reception unless each host computer 14 also transmits to the media source 12 a bandwidth reservation message (Resv) 24 in accordance with the Resource Reservation Protocol (RSVP) as specified under RFC 2205. As described in detail below, typically the host computer 14 requests a quality of service based on the media application requirements and less than the bandwidth capacity allocated by the host computer's Internet Service Provider (ISP); for example, the user of the host computer 14c may contract with an ISP such that the path 20a may be either a T1 link or a T3 link, depending upon the subscription contract with the ISP. Hence, if a media application requires a 1.2 Mb/s connection, the host computer 14c would send a bandwidth reservation message requesting 1.2 Mb/s as the requested quality of service.

As shown in FIG. 1, each reservation message 24 is passed between each router 18 in the path 20; hence, if each router 18 in the path between the media source 12 and the corresponding host 14 grants the reservation message, then a guaranteed quality of service is established between the media source 12 and the corresponding host computer 14 by reservation of bandwidth for the media stream by each of the routers in the path. For example, the transmission of a bandwidth reservation message by the host 14c that is received by the media source 12 results in a guaranteed quality of service (e.g., 1.2 Mb/s) between the media source 12 and the host 14c along the paths 20c, 20b, and 20a by the routers 18f, 18a and 18b, respectively. In particular, a "soft state" (e.g., an instance of an executable software process) for maintaining the guaranteed quality of service in accordance with RFC 2205 is established by the host 14c transmitting the bandwidth reservation message, each router 18 along the path, and the media source 12. Hence, the host computer 14c of subnetwork 16c is able to receive the media stream guaranteed at the requested quality of service of 1.2 Mb/s. The media source 12 will periodically send a path message to all the receivers in the multicast group; the path message is used by the soft states in each of the receivers (e.g., the host computer 14c) and the routers 18 along the path to maintain the guaranteed quality of service.

The host computers 14a and 14b of respective subnetworks 16a and 16b, however, receive the media streams from their respective routers 18g and 18h via respective network switching systems 22a and 22b. In particular, the switching systems 22 are configured for switching data packets between multiple network nodes within the same subnetwork 16 according to a local area network protocol such as Ethernet (IEEE 802.3) protocol. Hence, the host computers 14a and 14b are configured for sending and receiving data packets at 10 Mbps or 100 Mbps according to IEEE 802.3 protocol. Consequently, any traffic between a host 14 and its corresponding router 18 is limited to the capacity of the corresponding network switching system 22. As a result, instances may arise where a network switching system 22 encountering heavy network traffic may be unable to support a guaranteed quality of service as negotiated between the host computer (e.g., 14a) and the corresponding router (e.g., 18g).

Problems would arise if the network switching system 22 were to be configured to interact with the RSVP protocol soft state in the host computer 14. For example, the network switching system 22a could not send a reservation error message to the host computer 14a, since there is no agent in the operating system of the host computer 14a that would recognize an RSVP protocol message from the network switching system 22a; hence, the operating system in the host computer 14a would drop the reservation error message from the network switching system 22. In addition, if the network switching system 22a attempted to mimic the router 18g by sending to the host 14a an error message (e.g., ResvError) using as a source IP address the IP address of the router 18g, the soft state in the host 14a would process the error message and conclude the reservation could not be granted; however, the subsequent receipt of a confirmation message from the router 18g would result in two conflicting messages received by the host computer 14a.

According to the disclosed embodiment, the network switching system 22 is configured for controlling the bandwidth reservation messages between a host computer (e.g., 14a) and the corresponding router (e.g., 18g), without interference in the RSVP protocol between the host and the router. In particular, the network switching system 22, upon detecting a bandwidth reservation message from a host computer 14, determines whether the network switching system 22 has the available resources sufficient for the requested quality of service. If the network switching system 22 determines that there is a determined absence of the available resources, e.g., there is insufficient bandwidth for the requested quality of service, the network switching system 22 increases the requested quality of service in the data packets to an artificially high value that would be rejected by the router 18. For example, the network switching system may increase the requested quality of service from 1.2 Mb/s to 1200 Mb/s, where the router 18 is configured for rejecting any requested quality of service above 100 Mb/s.

Hence, the network switching system 22 is able to control allocating bandwidth for requested quality of service between a host computer 14 and its corresponding router 18, without interfering in the RSVP protocol.

Figure 2:
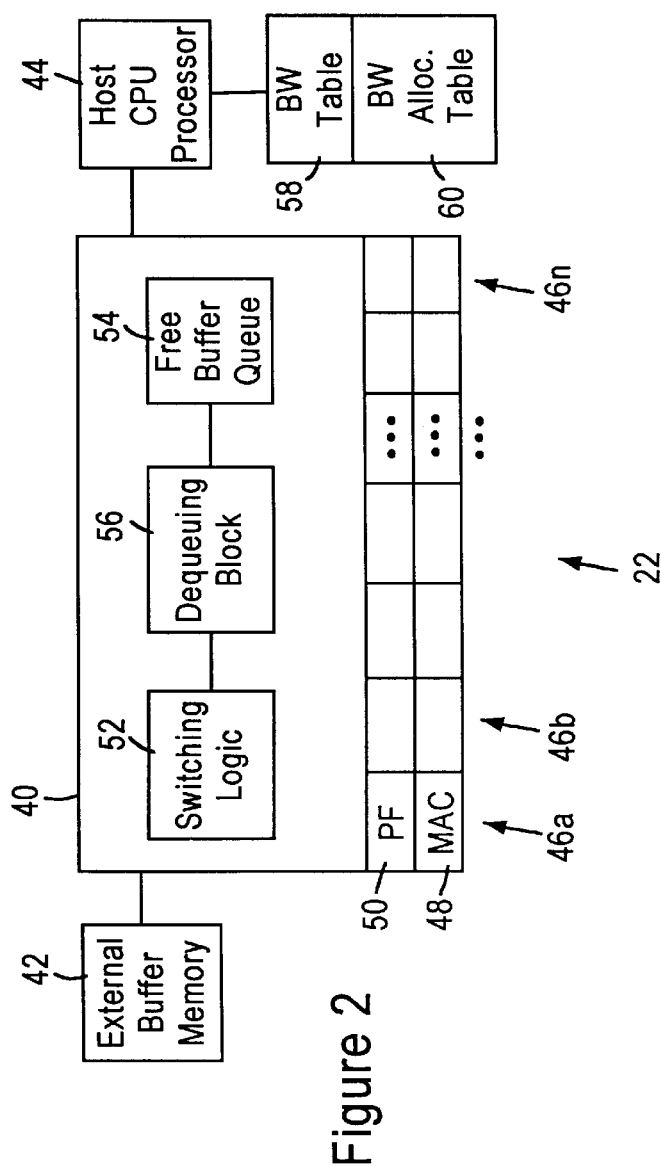
FIG. 2 is a diagram illustrating in detail the network switching system of FIG. 1.

FIG. 2 is a block diagram illustrating the network switching system 22 of FIG. 1 according to an embodiment of the present invention. The network switching system 22 includes an integrated multiple port network switch 40, an external buffer memory 42 for storing frame data, and a processing unit 44. The network switch 40 includes a plurality of network switch ports 46. Each switch port 46 includes a media access control (MAC) module 48 and a port filter (PF) 50. The MAC module 48 transmits and receives data packets to the associated network stations 14 across 10/100 Mbps physical layer (PHY) transceivers (not shown) according to IEEE 802.3u protocol. The integrated network switch 40 also includes switching logic 52 configured for making frame forwarding decisions for received data packets. In particular, the switching logic 52 is configured for layer 2 switching decisions based on source address, destination address, and VLAN information within the Ethernet (IEEE 802.3) header; the switching logic 52 is also configured for selective layer 3 switching decisions based on evaluation of an IP data packet within the Ethernet packet.

The host CPU 44 controls the overall operations of the network switch 40, including programming of the switching logic 52 and the port filter 50, and determining whether a received bandwidth reservation message should be modified. The buffer memory 42 is used to store data frames while the switching logic 52 is processing forwarding decisions for the received data packets. In particular, each memory location of prescribed size in the external memory 42 has a corresponding memory location pointer, referred to as a frame pointer, that is used to keep track of the stored frame data. The network switch 22 includes a free buffer queue 54 configured for storing the frame pointers that are not currently in use for storage of frame data. Hence, assuming that the external memory 42 has a size of 64 kilobytes and that each frame pointer specifies a 64-byte memory location in the external memory 42, then the network switch 40 would have up to 1024 frame pointers available for storage of frame data before overflow would occur.

The network switch 40 also includes a dequeuing block 56 configured for implementing the switching decisions by the switching logic 52. In particular, the switching logic 52 outputs a forwarding descriptor that includes a frame pointer and a corresponding port vector that identifies all the network switch ports 46 that are to output the frame data identified by the corresponding frame pointer. The dequeuing block 56 fetches the frame data from the memory location in the external memory 42 specified by the frame pointer, and supplies the frame data to the appropriate output ports 46. As described in detail below, the dequeuing block 56 is also configured for selectively modifying the requested quality of service field in the data packet in response to an instruction from the host CPU 44.

The port filter 50 is configured for multiple simultaneous comparisons between the incoming data stream and templates that identify the data format of the incoming data stream. Specifically, users of the host processor 26 will specify policies that define how data packets having prescribed data patterns should be handled by the switching logic 52. Hence, the host CPU 44 can be used to program the port filter 50 to identify a bandwidth reservation message that needs to be forwarded to the host CPU 44.

Figure 3:
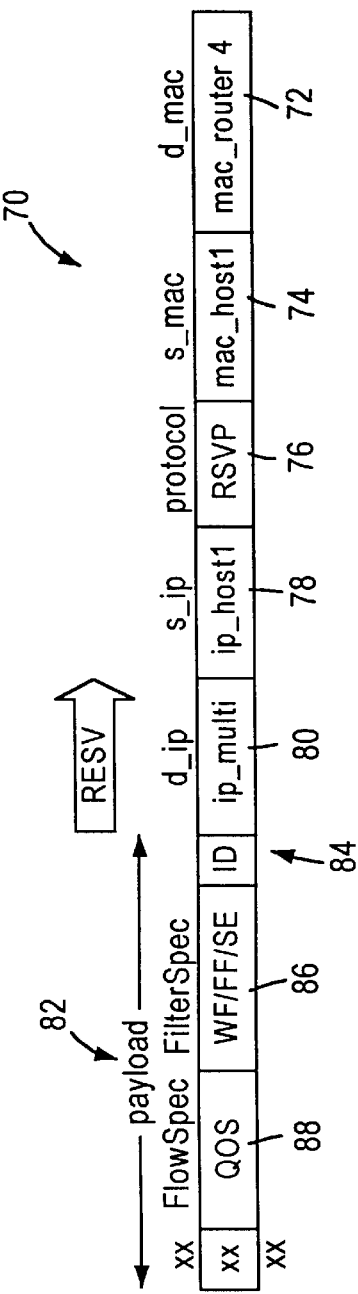
FIG. 3 is a diagram illustrating a bandwidth reservation message (Resv) according to the resource reservation protocol RFC 2205.

FIG. 3 is a diagram illustrating a bandwidth reservation message output by a host computer 14 according to the RSVP protocol specified by RFC 2205. As shown in FIG. 3, the bandwidth reservation message 70 includes a destination MAC address field (d_mac) 72, a source MAC address field (s_mac) 74, a protocol field 76, a source IP address field (s_ip) 78, a destination IP address field (d_ip) 80, and a payload portion 82 that includes RSVP protocol information according to RFC 2205. As shown in FIG. 3, the source MAC address field 74 and the source IP address field 78 specify the MAC and IP addresses of the host computer 14a, respectively. The destination MAC address field 72 includes the MAC address of the router 18g, and the destination IP address field 80 includes the IP address for the multicast group.

The payload portion 82 includes the necessary protocol parameters for a reservation message. In particular, the payload portion 82 includes a message identifier field 84 that specifies a reservation message (as opposed to a path message), a filter specification field (FilterSpec) 86 that specifies either a wild-card filter (WF) a fixed filter (FF), or shared explicit (SE), and a flow specification field (FlowSpec) 88. The flow specification field 88 specifies the requested quality of service (QOS) that is desired by the host computer 14, for example 1.2 Mb/s. According to the RSVP protocol, a router 18 checks the flow specification field 88 to determine whether the requested quality of service should be granted; if the requested quality of service is approved by the router 18, then the router reserves the requested bandwidth and forwards the bandwidth reservation message to the next router in the path. However, if the flow specification field 88 specifies a requested quality of service that exceeds an acceptable level by the router 18, then the router 18 returns a message to the host computer 14 that turns down the bandwidth reservation request.

Hence, the network switching system 22 can effectively control the bandwidth reservation message by selectively increasing the requested quality of service to a value that would be unacceptable to the router 18. The host CPU 44 selectively increases the value of the requested quality of service in the flow specification field 88 if the network switch 40 has insufficient resources, for example as measured by the number of frame pointers in the free buffer queue 54, to support the requested quality of service.

Figure 4:
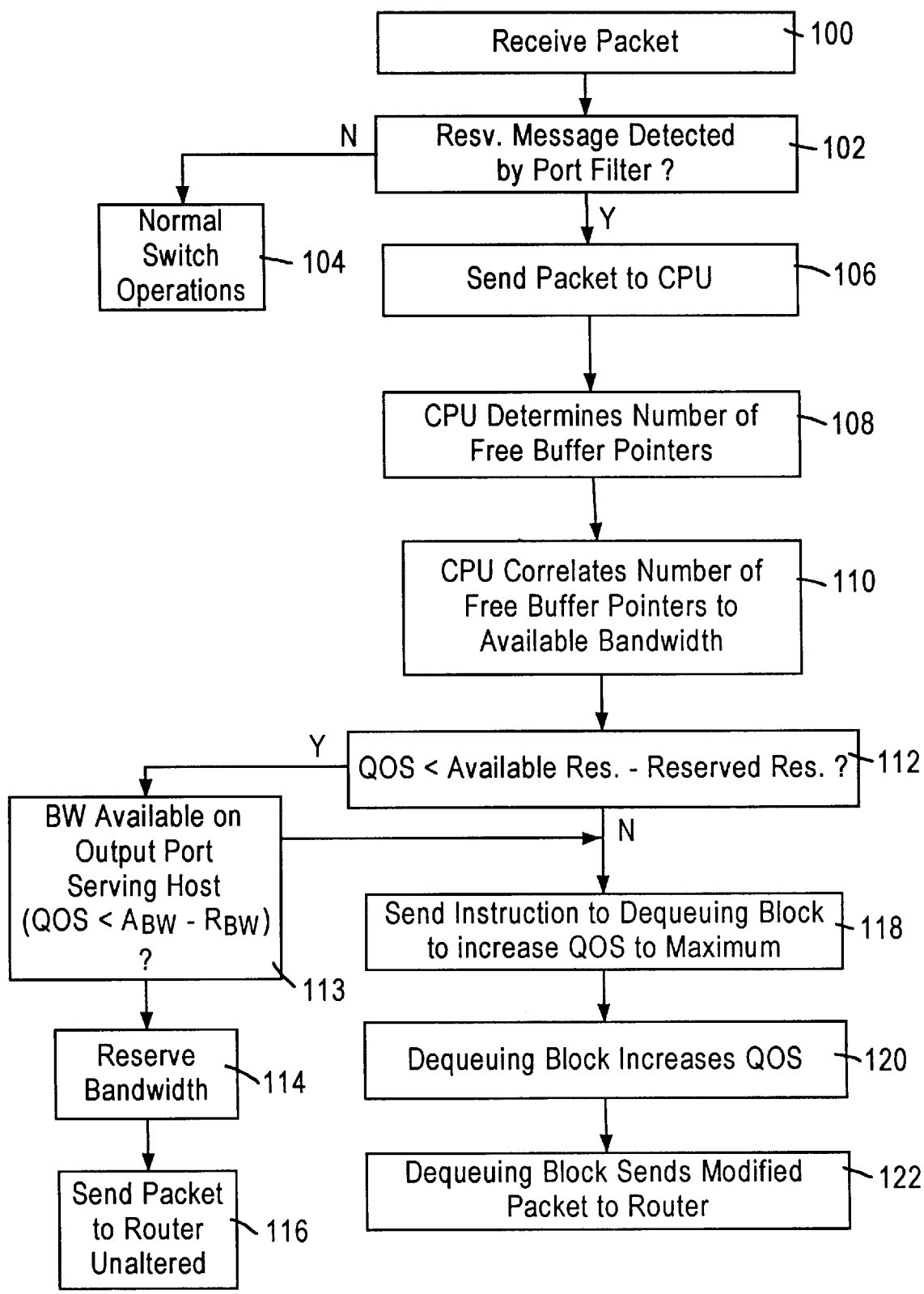
FIG. 4 is a diagram illustrating the method of selectively modifying a reservation message according to an embodiment of the present invention.

FIG. 4 is a diagram illustrating the method of selectively controlling the bandwidth reservation message by the network switching system 22 according to an embodiment of the present invention. The data packet 70 is received from the host computer 14 (e.g., 14a) by one of the network switch ports 46 in step 100 according to Ethernet (IEEE 802.3) protocol. Upon receiving the data packet 70 from the host computer 14a, the port filter 50 determines in step 102 whether the data packet 70 includes a bandwidth reservation message 82 based on the protocol field 76 specifying RSVP protocol; hence, the port filter 50 can detect the presence of the bandwidth reservation message within the first 64 bytes of the data frame 70, enabling the immediate transfer of the data packet 70 to the CPU 44 as the data packet is received.

If in step 102 the port filter 50 determines that the data packet does not include a bandwidth reservation message according to the RSVP protocol specified in RFC 2205, then normal switching operations are performed in step 104. However if in step 102 the port filter 50 detects the bandwidth reservation message having the requested quality of service (QOS) specified in the flow specification field 88, the packet 70 is sent to the host CPU 44 in step 106.

The host CPU 44 then determines whether the network switch 40 has available resources that are sufficient for the requested quality of service. For example, the host CPU 44 determines in step 108 the number of free buffer pointers in the free buffer queue 54. The host CPU 44 then correlates the number of free buffer pointers to the amount of available bandwidth in the network switch 40 in step 110: for example, the CPU 44 may access a bandwidth table 58, illustrated in FIG. 2, that correlates a number of free pointers to available bandwidth (e.g., 30% free corresponds to 50 Mb/s available guaranteed bandwidth, 20% free corresponds to 25 Mb/s guaranteed bandwidth, 10% free corresponds to 10 Mb/s bandwidth for a 100 Mb/s link; 30% free corresponds to 5 Mb/s available guaranteed bandwidth, 20% free corresponds to 2.5 Mb/s guaranteed bandwidth, 10% free corresponds to 1.0 Mb/s bandwidth for a 10 Mb/s link).

The host CPU 44 then compares in step 112 the requested quality of service with the amount of available guaranteed resources (e.g. bandwidth) as calculated in step 110, minus any resources (e.g., bandwidth) that has already been reserved, for example for another host computer 14. For example, the host CPU 44 may access a bandwidth allocation table 60, illustrated in FIG. 2, to determine if any bandwidth has already been reserved. If the host CPU 44 determines that the network switch 40 has sufficient resources for the requested quality of service based on the number of free pointers, the host CPU then determines whether there are sufficient resources on the output port 46 serving the host computer (e.g., 14a) by checking in step 113 whether there is sufficient available output bandwidth for the requested quality of service. For example, if the output port 46 is configured as a 100 Mb/s port having 100 Mb/s available bandwidth ($A_{BW}$) and the host CPU 44 has already reserved 70 Mb/s of bandwidth ($R_{BW}$) on the output port 46 for another approved request from the host computer (e.g., 14a), then the CPU 44 checks that there remains sufficient available output bandwidth (e.g., $A_{BW}-R_{BW}=30$ Mb/s) for the requested quality of service.

If in step 113 the host CPU 44 determines that the output port 46 for the host computer 14 has sufficient remaining bandwidth for the requested quality of service, the host CPU 44 reserves the bandwidth in step 114 for the requested quality of service by adding an entry to the bandwidth allocation table 60, and enables the switch 40 to send the data packet 70 to the router 18 in step 116 without modification. The host CPU 44 may also establish a virtual soft state, where the port filter 50 of the network switch port 46 serving the router 18 is configured for detecting path messages to the host computer 14, enabling the CPU 44 to control the duration at which the bandwidth allocation entry is maintained within the bandwidth allocation table 60. Note, however, that this "virtual soft state" is strictly for maintaining the reserved bandwidth within the bandwidth allocation table 60, hence the virtual soft state executed by the host CPU 44 does not interact with the RFC 2205 compliant soft states in the lost computer 14 or the router 18.

If in steps 112 or 113 the host CPU 44 determines the absence of the available resources sufficient for the requested quality of service, e.g., that there are insufficient resources in step 112 or there is insufficient output port bandwidth for the requested quality of service in step 113, then the host CPU 44 sends an instruction in step 118 to the dequeuing block 56 to increase the requested quality of service (QOS) in the flow specification field 88, for example to a maximum value (all ones binary). The dequeuing block 56 in response increases the QOS value to a value that will be denied by the router in step 120 as the frame data is fetched from the external memory 42 for output to the network switch port 46 serving the router 18. The dequeuing block 56 then sends the modified packet to the appropriate network switch port 46 for output to the router 18.

According to the disclosed embodiment, a network switch configured for transferring data packets according to Ethernet (IEEE 802.3) protocol selectively monitors and controls bandwidth reservation messages between a host computer and a router, to ensure the network switch is not overwhelmed, without interference in the RSVP protocol between the host computer and the router. Hence, the network switching system ensures that guaranteed quality of service can be provided without overwhelming network switch resources, and without any modification to the existing RFC 2205 protocol or the soft state routines executed within the host computer and the router 18.

While this invention has been described with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network switching system, the method comprising:
   receiving by a network switching system a data packet from a host computer and having a media access control (MAC) destination address specifying a router;
   detecting within the data packet a bandwidth reservation message having a requested quality of service;
   determining whether the network switching system has at least an available resource sufficient for the requested quality of service;
   selectively modifying the data packet by selectively increasing by the network switching system the requested quality of service specified in the data packet to at least a prescribed value forcing denial of the bandwidth reservation message by the router, based on a determined absence of the available resource; and
   outputting the data packet to the router based on the MAC destination address.

2. The method of claim 1, wherein the detecting step includes determining by a port filter within a network switch port of the network switching system that the data packet includes the bandwidth reservation message.

3. The method of claim 2, further comprising forwarding the data packet to a processing unit within the network switching system in response to detection of the bandwidth reservation message.

4. The method of claim 3, wherein the step of determining whether the network switching system has at least the available resource sufficient for the requested quality of service includes determining the available resource within the network switching system, and comparing the available resource to the requested quality of service.

5. The method of claim 4, wherein the step of determining the available resource includes determining a number of free buffer pointers within a free buffer queue relative to a total number of buffer pointers, each said buffer pointer specifying a corresponding memory location in a buffer memory configured for storing a plurality of the data packets, the available resource based on the number of free buffer pointers.

6. The method of claim 5, wherein the selectively increasing step includes sending an instruction from the processing unit to a dequeuing block within the network switching system to set the requested quality of service to a maximum value.

7. The method of claim 1, wherein the network switching system includes an integrated network switch and a processing unit, the detecting step including determining by one of the network switch ports of the integrated network switch that the data packet includes the bandwidth reservation message.

8. The method of claim 7, wherein the step of determining whether the network switching system has at least the available resource sufficient for the requested quality of service includes determining the available resource within the integrated network switch by the processing unit, and comparing by the processing unit the available resource to the requested quality of service.

9. The method of claim 8, wherein the step of determining the available resource includes determining a number of free buffer pointers within a free buffer queue relative to a total number of buffer pointers, each said buffer pointer specifying a corresponding memory location in a buffer memory configured for storing a plurality of the data packets, the available resource based on the number of free buffer pointers.

10. The method of claim 9, wherein the step of determining the available resource includes correlating the number of free buffer pointers to a bandwidth value by comparing the number of free buffer pointers to a table that specifies bandwidth relative to the number of free buffer pointers relative to the total number of buffer pointers.

11. The method of claim 9, wherein the step of determining the available resource includes subtracting a prescribed amount of reserved bandwidth from the bandwidth value.

12. The method of claim 1, further comprising reserving bandwidth within the network switching system for the requested quality of service based on a determined presence of the available resource.

13. The method of claim 1, wherein the step of determining the available resource includes determining an available output bandwidth of a network switch port serving the host computer, and comparing the available output bandwidth of the network switch port to the requested quality of service.

14. A network switching system comprising:
   an integrated network switch including:
   (1) a plurality of network switch ports, at least one of the network switch ports configured for detecting within a data packet, received from a host computer, a bandwidth reservation message having a requested quality of service,
   (2) switching logic configured for identifying a second of the network switch ports for outputting the data packet to a router based on a corresponding media access control (MAC) destination address, and
   (3) logic for selectively modifying the data packet by selectively increasing the requested quality of service specified in the data packet to at least a prescribed value forcing denial of the bandwidth reservation message by the router; and
   a processing unit configured for controlling the logic to increase the requested quality of service specified in the data packet to at least the prescribed value, prior to outputting of the data packet, based on a determined absence of available resources within the integrated network switch sufficient for the requested quality of service.

15. The system of claim 14, wherein the integrated network switch further includes a free buffer queue configured for storing a plurality of free buffer pointers, each free buffer pointer specifying a corresponding available memory location for storage of packet data, the processing unit accessing the free buffer queue for determining whether the integrated network switch has the available resources for the requested quality of service.

16. The system of claim 15, wherein the processing unit reserves at least a portion of the available resources for the requested quality of service for at least a prescribed time interval.

17. The system of claim 14, wherein each network switch port includes a port filter configured for detecting a prescribed pattern within a data packet, the port filter of the one network switch port configured by the processing unit for detecting the bandwidth reservation message.

18. The system of claim 14, wherein the processing unit determines the presence of the available resources for the requested quality of service based on a determined available output bandwidth for the one network switch port serving the host computer.

* * * * *